(12) United States Patent
Hatch

(10) Patent No.: US 6,314,983 B1
(45) Date of Patent: Nov. 13, 2001

(54) FLOW CONTROLLER FOR A POOL CLEANER

(75) Inventor: Christopher E. Hatch, San Diego, CA (US)

(73) Assignee: Polaris Pool Systems, Inc., Vista, CA (US)

( * ) Notice: Subject to any disclaimer, the term of this patent is extended or adjusted under 35 U.S.C. 154(b) by 0 days.

(21) Appl. No.: 09/690,332

(22) Filed: Oct. 16, 2000

Related U.S. Application Data

(60) Provisional application No. 60/159,996, filed on Oct. 18, 1999.

(51) Int. Cl.[7] .................................................... F16K 17/06
(52) U.S. Cl. ............................ 137/114; 137/907; 251/303
(58) Field of Search ................................... 137/111, 112, 137/113, 114, 907; 251/303

(56) References Cited

U.S. PATENT DOCUMENTS

| | | | |
|---|---|---|---|
| 660,400 | * 10/1900 | Smith . | |
| 1,463,103 | * 7/1923 | Thorsten . | |
| 4,368,751 | 1/1983 | Chauvier | 137/114 |
| 4,570,660 | 2/1986 | Chauvier | 137/114 |
| 4,643,217 | 2/1987 | Frentzel | 137/112 |
| 4,683,599 | 8/1987 | Rief . | |
| 4,729,406 | 3/1988 | Frentzel | 137/112 |
| 4,790,344 | 12/1988 | Chauvier et al. | 137/112 |
| 5,033,504 | 7/1991 | Kallenbach . | |
| 5,105,848 | 4/1992 | Kallenbach . | |
| 5,156,374 | * 10/1992 | Fort et al. | 251/303 |
| 5,285,547 | 2/1994 | Sebor . | |
| 5,351,709 | 10/1994 | Vos | 137/114 |
| 5,363,877 | 11/1994 | Frentzel et al. . | |
| 5,363,878 | 11/1994 | Atkins . | |
| 5,477,879 | 12/1995 | Vos | 137/513.5 |
| 5,570,713 | * 11/1996 | Stolz et al. | 137/114 |
| 5,904,171 | * 5/1999 | Stable et al. | 137/114 |

* cited by examiner

Primary Examiner—Stephen M. Hepperle
(74) Attorney, Agent, or Firm—Kelly Bauersfeld; Lowry & Kelley, LLP

(57) ABSTRACT

A flow controller is provided for use with a pool cleaner, particularly of the type powered by a suction or vacuum source via a flexible vacuum hose or the like connected to the suction side of conventional pool water filtration equipment, wherein the flow controller maintains the suction pressure applied to the pool cleaner at a substantially constant and adjustably preset level consistent with substantially optimized pool cleaner operation. The flow controller comprises a generally tubular housing mounted at a location submerged within the pool water, preferably by installation in-line along the vacuum hose coupled to the pool cleaner. The flow controller includes a pivotally mounted flap valve biased by a spring for normally closing a bypass relief port. The flap valve is drawn by suction pressure toward a modulated open position to prevent the suction pressure from exceeding a preset threshold level. An adjustment knob on the flow controller housing is rotatably coupled to the biasing spring for adjustably increasing or decreasing the spring closure force applied to the flap valve, thereby adjustably setting the threshold suction pressure at which the flap valve opens the bypass relief port. The adjustment knob is coupled to the biasing spring via a worm gear engaged with a spur gear having an arcuate gap segment thereon formed without gear teeth, wherein the gap segment defines limit stops to prevent spring force adjustment beyond a predetermined range.

18 Claims, 9 Drawing Sheets

FLOW CONTROLLER FOR A POOL CLEANER

RELATED APPLICATION

This application claims the benefit of U.S. Provisional Application No. 60/159,996, filed Oct. 18, 1999.

BACKGROUND OF THE INVENTION

This invention relates generally to pool cleaning systems of the type including a so-called automatic pool cleaning device adapted for travel over submerged surfaces of a swimming pool or the like to pick up and collect accumulated debris such as leaves, twigs, sand and silt. More particularly, this invention relates to a flow controller for installation along a flexible hose or the like used for connecting the pool cleaner to a hydraulic power source such as a suction or vacuum source by connection to the suction side of a conventional pool water filtration system. The flow controller of the present invention is designed to maintain the suction pressure applied to the pool cleaner at a substantially constant and easily adjustable preset threshold level consistent with substantially optimized pool cleaner operation.

Pool cleaner systems and related devices are generally well known in the art for use in maintaining residential and commercial swimming pools in a clean and attractive condition. In this regard, swimming pools conventionally include a water filtration system equipped with a pump for drawing or suctioning water from the pool for circulation through a filter canister having filter media therein to remove and collect water-entrained debris such as leaves and twigs as well as fine particulate including sand and silt. In a typical arrangement, at least a portion of the pool water is vacuum-drawn over a weir mounted within a so-called skimmer well positioned substantially at the water surface to draw and collect floating debris to the filter equipment. From the filter canister, the water is recirculated to the pool via one or more return lines. Such filtration equipment is normally operated for several hours on a daily basis and serves, in combination with traditional chemical treatments such as chlorination or the like, to maintain the pool water in a clean and clear sanitary state. However, the water filtration system is ineffective to filter out debris which settles onto submerged floor and side wall surfaces of the swimming pool. In the past, settled debris has typically been removed by coupling a vacuum hose to the suction side of the pool water filtration system, such as by connecting the vacuum hose to the skimmer well located near the water surface at one side of the pool, and then manually moving a vacuum head coupled to the hose over the submerged pool surfaces to vacuum settled debris directly to the filter canister where it is collected and separated from the pool water. However, manual vacuuming of a swimming pool is a labor intensive task and is thus not typically performed by the pool owner or pool cleaning service personnel on a daily basis.

So-called automatic pool cleaner devices have been developed over the years for cleaning submerged pool surfaces, thereby substantially eliminating the need for labor intensive manual vacuuming. Such automatic pool cleaners typically comprise a relatively compact cleaner housing or head coupled to the pool water filtration system by a hose and including water-powered means for causing the cleaner to travel about within a swimming pool to dislodge and collect settled debris. In one form, the pool cleaner is connected to the return or pressure side of the filtration system for receiving positive pressure water which powers a turbine for rotatably driving cleaner wheels, and also functions by venturi action to draw settled debris into a filter bag. See, for example, U.S. Pat. Nos. 3,882,574; 4,558,479; 4,589,986; and 4,734,954. In another form, the pool cleaner is coupled by a vacuum hose to the suction side of the filtration system, whereby water is drawn through the pool cleaner to operate a drive mechanism for transporting the cleaner within the pool while vacuuming settled debris to the filter canister of the pool filtration system. See, for example, U.S. Pat. Nos. 3,803,658; 4,023,227; 4,133,068; 4,208,752; 4,643,217; 4,679,867; 4,729,406; 4,761,848; 5,105,496; 5,265,297; 5,634,229; and 6,094,764. See also copending U.S. Ser. No. 09/176,532, filed Oct. 21, 1998.

For optimum cleaning efficiency, it is normally desirable to provide a substantial and relatively constant water pressure for operating the pool cleaner to achieve traversal of submerged pool floor and side wall surfaces with sufficient traction to maintain vacuuming structures in close proximity with the submerged pool surfaces, and also to insure pool cleaner travel in a substantially random pattern while covering of most or all submerged pool surfaces within a relatively short period of time. However, the available pressure generated by the pool water filtration system can vary widely in accordance with numerous factors, such as differences in pump size and power, pipe line sizes, filter canister capacity and degree of cleanliness, etc. For this reason, pool cleaners have typically been designed for substantially optimized operation at a water pressure somewhat less that the maximum pressure capacity of a typical filtration system, and a flow regulator or controller is normally provided to limit the pressure coupled to the pool cleaner to a selected design threshold consistent with proper cleaner performance. See, for example, U.S. Pat. Nos. 5,363,877; 5,033,504; 5,570,713; 4,729,406; 4,643,217; 5,285,547; 5,477,879; 5,363,878; 5,351,709; 5,105,848; 4,790,344; 4,570,660; 4,368,751; and 4,683,599 for a variety of flow controller devices designed for limiting the suction pressure applied to a suction powered pool cleaner by modulated opening of a bypass relief port. These flow controller devices additionally and beneficially insure an uninterrupted supply of water to the suction side of the pool filtration pump in the event that the associated suction powered pool cleaner becomes clogged. However, these prior devices generally do not accommodate quick and easy adjustable setting of the suction pressure limit, as is frequently desired for fine-tuning the specific operating characteristics of a pool cleaner in accordance with the geometric configuration of a particular swimming pool.

The present invention relates to an improved flow controller for regulating and maintaining the water pressure coupled to a pool cleaner at a selected threshold limit consistent with substantially optimized pool cleaner operation, wherein the pressure threshold is quickly and easily adjustable for fine-tuning the specific operating characteristics of the pool cleaner.

SUMMARY OF THE INVENTION

In accordance with the invention, an improved flow controller is provided for use with a pool cleaner, particularly of the type powered by a suction or vacuum source via a flexible vacuum hose or the like connected to the suction side of conventional pool water filtration equipment. The improved flow controller is designed for fine-tuning adjustment to maintain the suction pressure applied to the pool cleaner at a substantially constant and adjustably preset level consistent with substantially optimized pool cleaner operation. The flow controller additionally includes limit stops to confine adjustment to a predetermined pressure range.

In a preferred form, the flow controller comprises a generally tubular housing mounted at a location submerged within the pool water, such as by installation in-line along the vacuum hose coupled to the pool cleaner. The flow controller includes a pivotally mounted flap valve biased by a spring for normally closing a bypass relief port. The flap valve is drawn by suction pressure toward a modulated open position to prevent the suction pressure from exceeding an adjustably preset threshold level. An adjustment assembly includes an adjustment knob mounted on the flow controller housing and rotatably coupled to the biasing spring for adjustably increasing or decreasing the spring closure force applied to the flap valve, thereby adjustably setting the threshold suction pressure at which the flap valve opens the bypass relief port. The adjustment knob is coupled to the biasing spring via a worm gear engaged with a spur gear having an arcuate gap segment thereon formed without gear teeth, wherein the arcuate gap segment defines opposite end limit stops to prevent spring force adjustment beyond a predetermined range.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
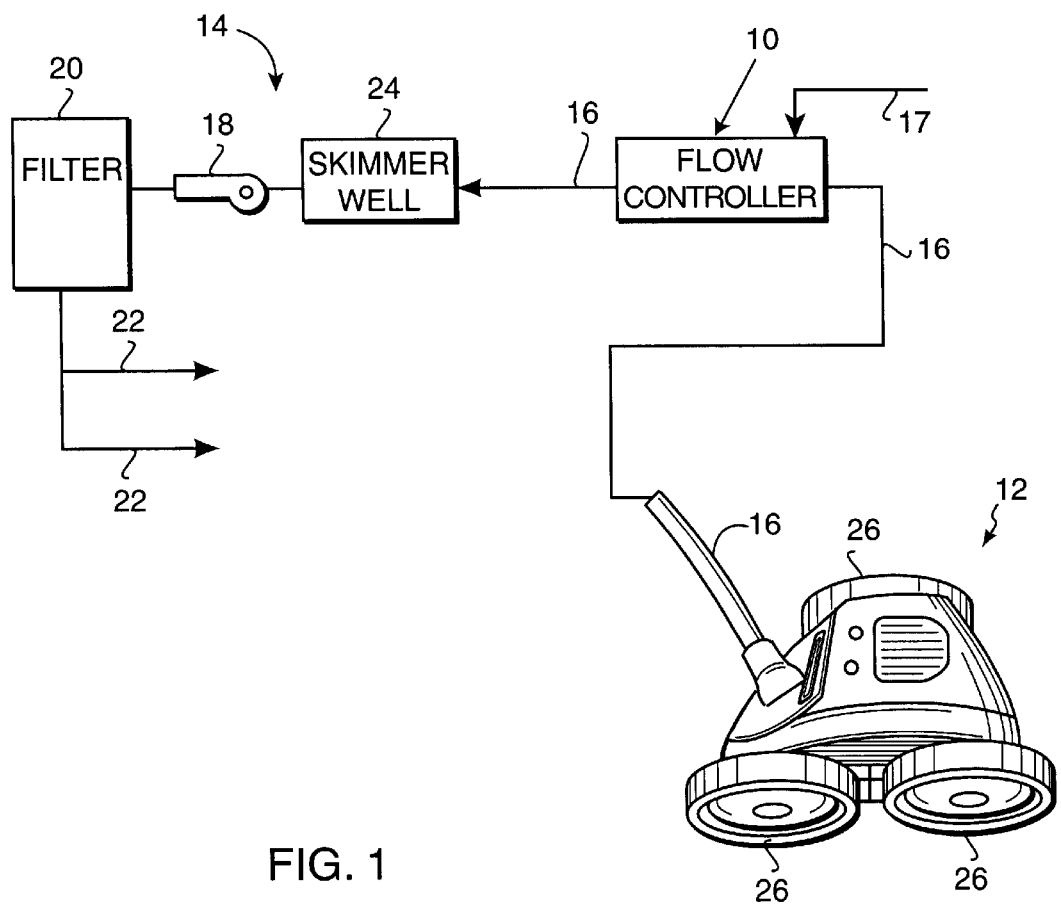
FIG. 1 is a schematic representation of a swimming pool filtration system in combination with a suction-powered pool cleaner for cleaning submerged pool floor and side wall surfaces, and further including a flow controller of the present invention.
Figure 2:
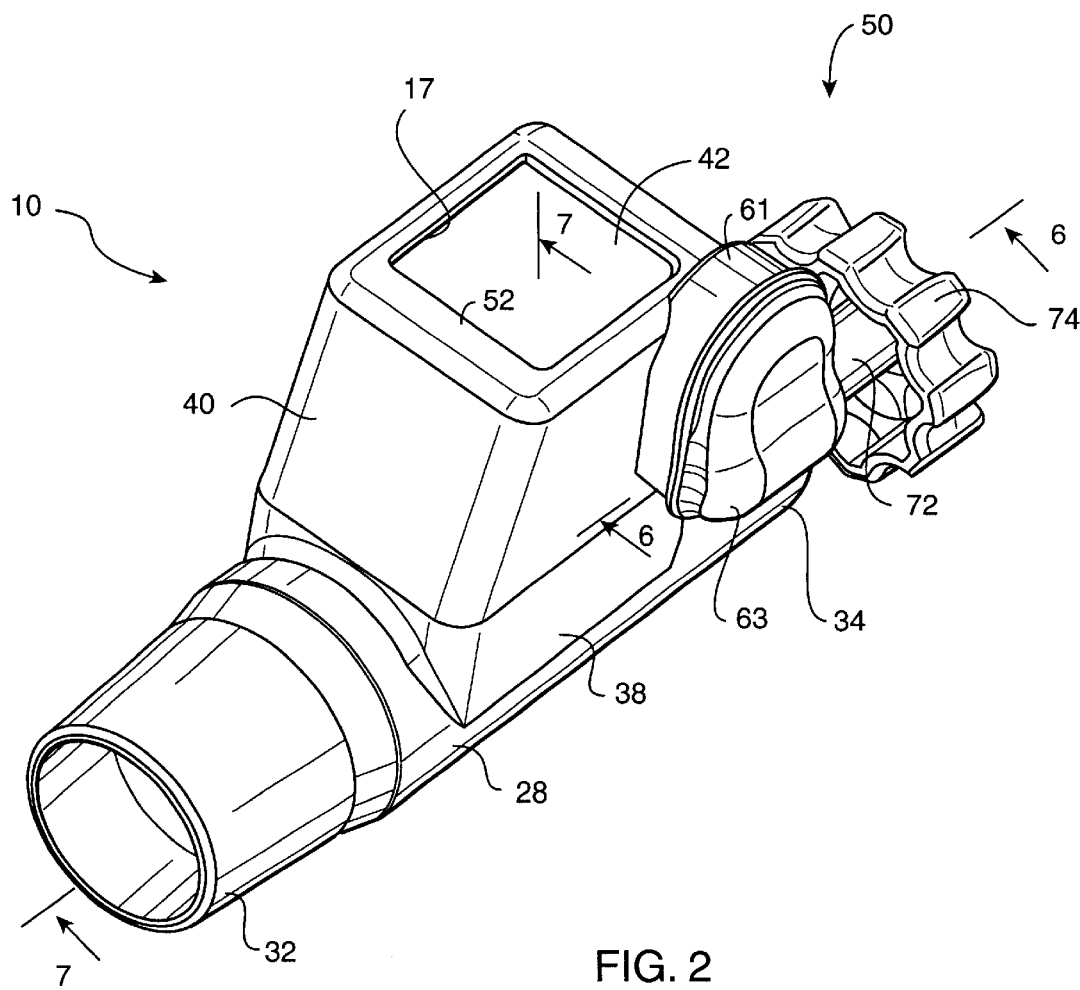
FIG. 2 is a top perspective view of the flow controller embodying the novel features of the invention.
Figure 3:
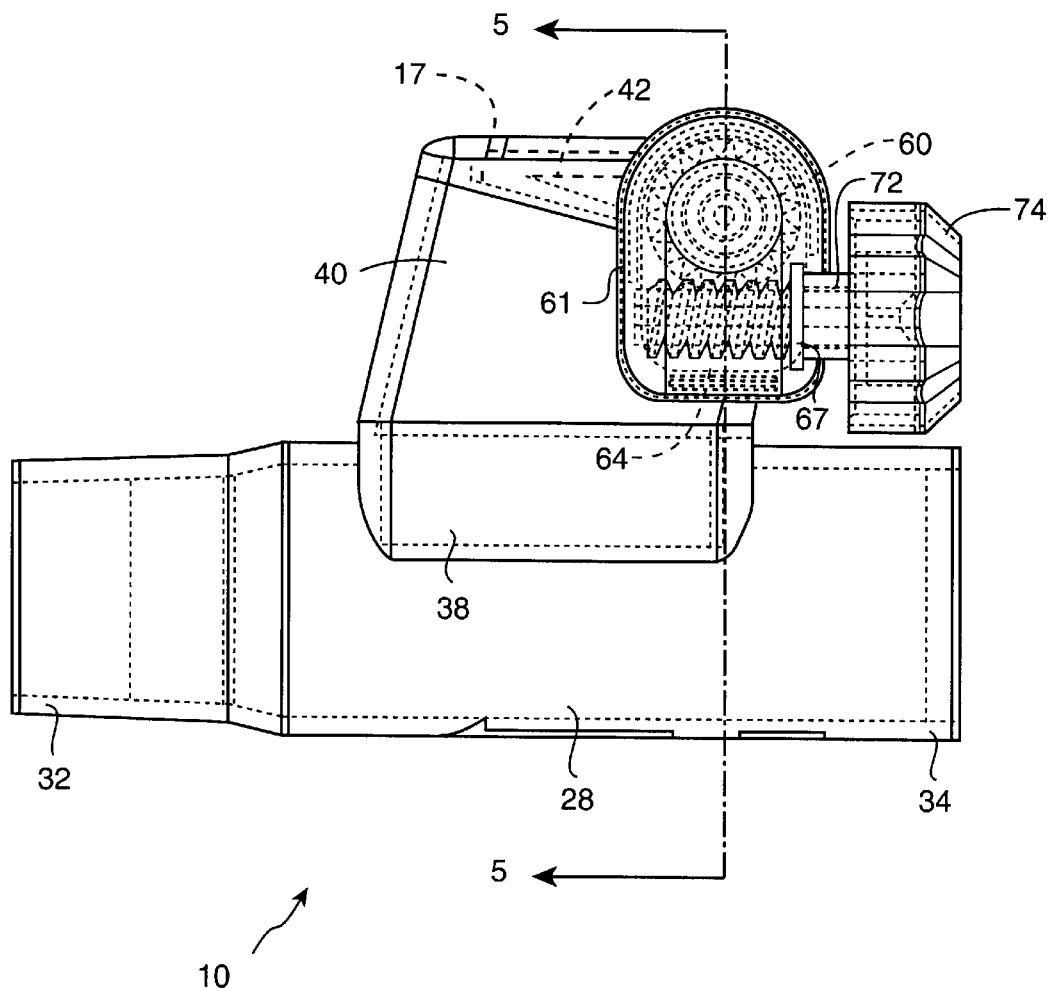
FIG. 3 is a side elevation view of the flow controller.

As shown in the exemplary drawings, a flow controller referred to generally in FIGS. 1–10 by the reference numeral 10 is provided for use in a water filtration and cleaning system for a swimming pool or the like, wherein the flow controller 10 is used in combination with a pool cleaner 12 of the suction-powered type for vacuuming debris such as leaves and twigs as well as small particulate such as sand and silt settled onto submerged floor and wall surfaces of the swimming pool. The illustrative pool cleaner 12 shown in FIG. 1 is powered by a suction or vacuum source, such as a conventional pool water filtration system 14 as depicted schematically in FIG. 1, by connection to the filtration system via a flexible vacuum hose 16. In a preferred form, the flow controller 10 is mounted in-line along the length of the vacuum hose 16, and responds to the magnitude of the suction pressure along the hose 16 for modulated opening of a bypass relief port 17 to maintain the suction pressure substantially at a predetermined constant and adjustably preset level consistent with substantially optimized pool cleaner operation. In accordance with a primary aspect of the invention, the flow controller 10 includes means for quick and easy adjustment of the preset maximum suction pressure level to accommodate fine-tuning of the specific operating characteristics of a pool cleaner in accordance with the geometric configuration of a particular swimming pool.

The pool water filtration system 14 conventionally includes a pump 18 for drawing water from the swimming pool for passage through a filter canister 20 having a selected filtration media (not shown) contained therein for capturing and collecting silt and grit and other particulate debris matter entrained in the water flow stream. The thus-filtered water is then recirculated to the swimming pool through one or more return conduits 22. In a typical water filtration system, at least a portion of the water drawn from the pool by the pump 18 is drawn through a skimmer well 24 which is normally mounted at one edge of the pool generally at the water's surface and includes a weir (not shown) over which water is drawn to skim and collect debris floating on the surface of the pool water.

When a suction-powered pool cleaner 12 is coupled with the filtration system 14 for enhanced cleaning of pool surfaces, the vacuum hose 16 is often connected (as viewed schematically in FIG. 1) to extend between the skimmer well 24 and the pool cleaner. Alternately, it will be recognized and understood that some swimming pools may be equipped with a dedicated suction cleaner flow line (not shown) coupled directly from the pool wall to the filtration system 14, in which case the vacuum hose 16 would be coupled to said suction flow line. In either case, the filtration system 14 draws water from the swimming pool through the cleaner 12 and further through the vacuum hose 16 to the pump 18 for delivery in turn to the filter canister 20. This vacuum or suction water flow drawn through the pool cleaner 12 provides a power source for rotatably driving the pool cleaner in a manner achieving substantially random travel of the cleaner throughout the pool to dislodge and vacuum debris settled upon submerged pool floor and side wall surfaces. While the specific type of suction-powered pool cleaner may vary, one preferred pool cleaner is constructed as shown and described in copending U.S. Pat. No. 6,094,764, which is incorporated by reference herein. Such pool cleaner, as illustrated generally in FIG. 1, incorporates internal drive means (not shown) for rotatably driving one or more cleaner wheels 26 for transporting the pool cleaner throughout the pool, together with means for vacuuming settled debris to the vacuum hose 16. Other exemplary suction powered pool cleaners are shown and described, by way of example, in U.S. Pat. Nos. 3,803,658; 4,023,227; 4,133,068; 4,208,752; 4,643,217; 4,679,867; 4,729,406;

4,761,848; 5,105,496; 5,265,297; and 5,634,229. See also copending U.S. Ser. No. 09/176,532, filed Oct. 21, 1998.

In general terms, the flow controller 10 of the present invention is installed at a submerged location between the pool cleaner 12 and the suction intake side of the filtration system pump 18, with a preferred installation site mounted in-line along the length of the vacuum hose 16. The flow controller 10 includes a spring-loaded valve member (not shown in FIG. 1) for normally closing the bypass relief port 17. During normal operation, the filtration system pump 18 applies a suction pressure to the pool cleaner 12 via the vacuum hose 16 and the flow controller 10. The spring-loaded valve member of the flow controller 10 movably responds when the magnitude of the vacuum or suction pressure reaches an adjustably set and predetermined threshold pressure level to open the bypass relief port 17. The valve member modulates the degree of opening of the bypass relief port 17 in a manner which maintains the suction pressure applied to the pool cleaner substantially at the predetermined threshold level. In this manner, the suction pressure can be regulated to a level which is substantially consistent with optimized operation of the pool cleaner to clean submerged surfaces of a swimming pool. In accordance with a further primary aspect of the invention, the adjustment means for setting the predetermined threshold pressure level includes limit or stop means for providing quick and easy pressure level adjustment within a predetermined limited range.

As shown best in FIGS. 2–10, the flow controller 10 of the present invention comprises a housing means in the form of a generally tubular housing 28 defining an open and uninterrupted flow path 30 extending between a pair of cylindrical fittings 32 and 34 adapted for in-line connection with the vacuum hose 16. A generally rectangular opening 36 (FIG. 4) is formed in the tubular housing 28 at a location generally mid-way along the length thereof, and this rectangular opening 36 is bounded by an outwardly projecting base wall 38 of generally rectangular shape. A short bypass duct 40 has a size and shape for secure and seated attachment by means of an adhesive or the like onto the base wall 38. An outboard end of the bypass duct 40 has a generally rectangular opening formed therein defining the bypass relief port 17 opening laterally with respect to the flow path 30.

The spring-loaded valve member comprises a flap valve 42 mounted within the bypass duct 40 at an inboard side of the relief port 17. More particularly, the flap valve 42 comprises a generally rectangular member having an enlarged and generally cylindrical mounting sleeve 44 (FIGS. 4, 9 and 10) formed along one side edge thereof. This mounting sleeve 44 defines an elongated bore for slide-fit reception of a pivot shaft 46 having one end thereof seated within a pivot port 48 (FIG. 4) formed in one side wall of the bypass duct 40, and an opposite end connected to an adjustment assembly 50 mounted at an opposite side wall of the bypass duct 40. The flap valve 42 is supported for pivoting or swinging movement on the pivot shaft 46 between a first position (FIG. 9) bearing against the inboard side of a peripheral rim 52 lining the relief port 17 to close said relief port, and a second position (FIG. 10) swung downwardly from the peripheral rim 52 to open said relief port 17.

Figure 4:
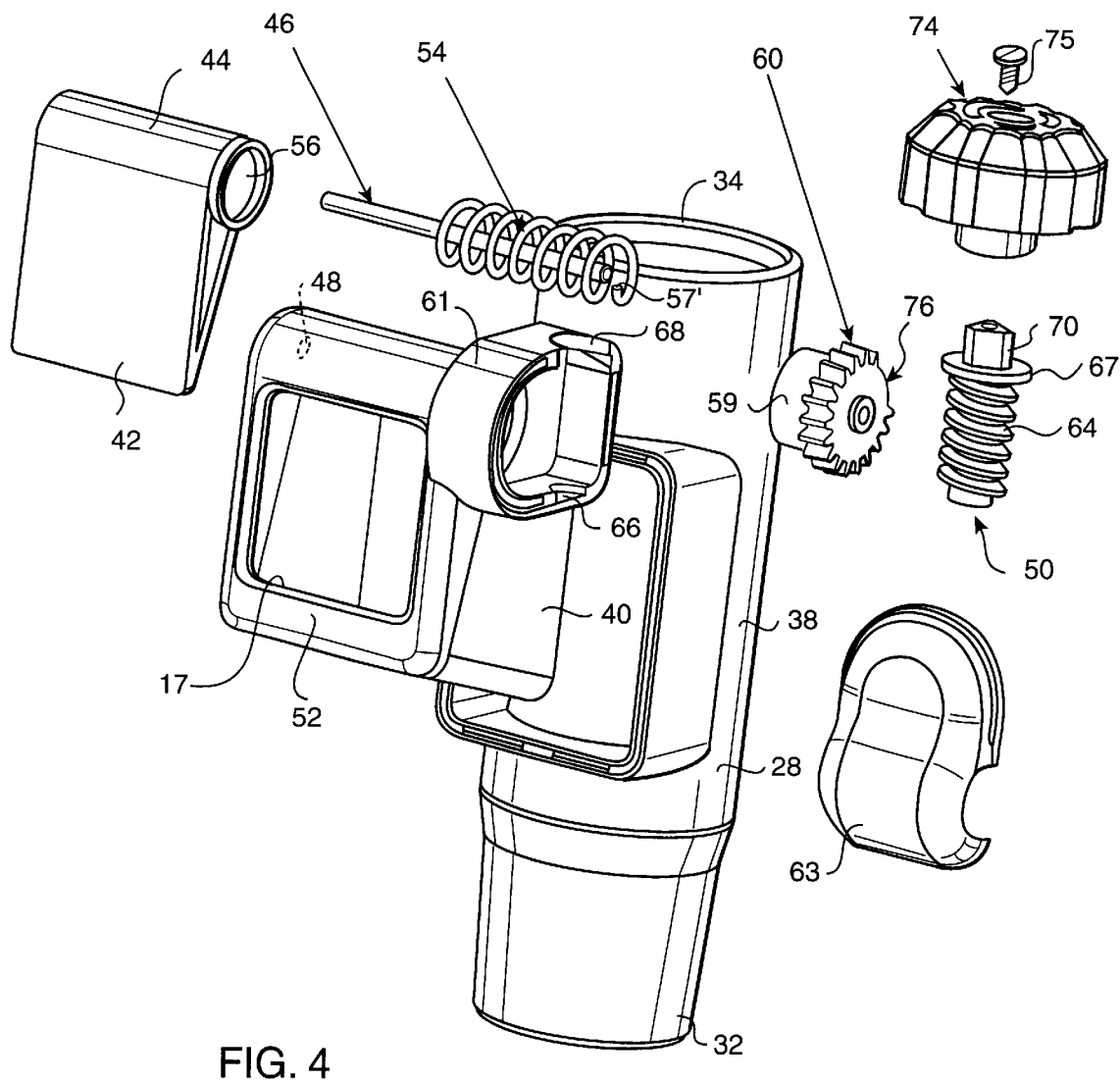
FIG. 4 is an exploded perspective view showing assembly of components forming the flow controller of the present invention.
Figure 5:
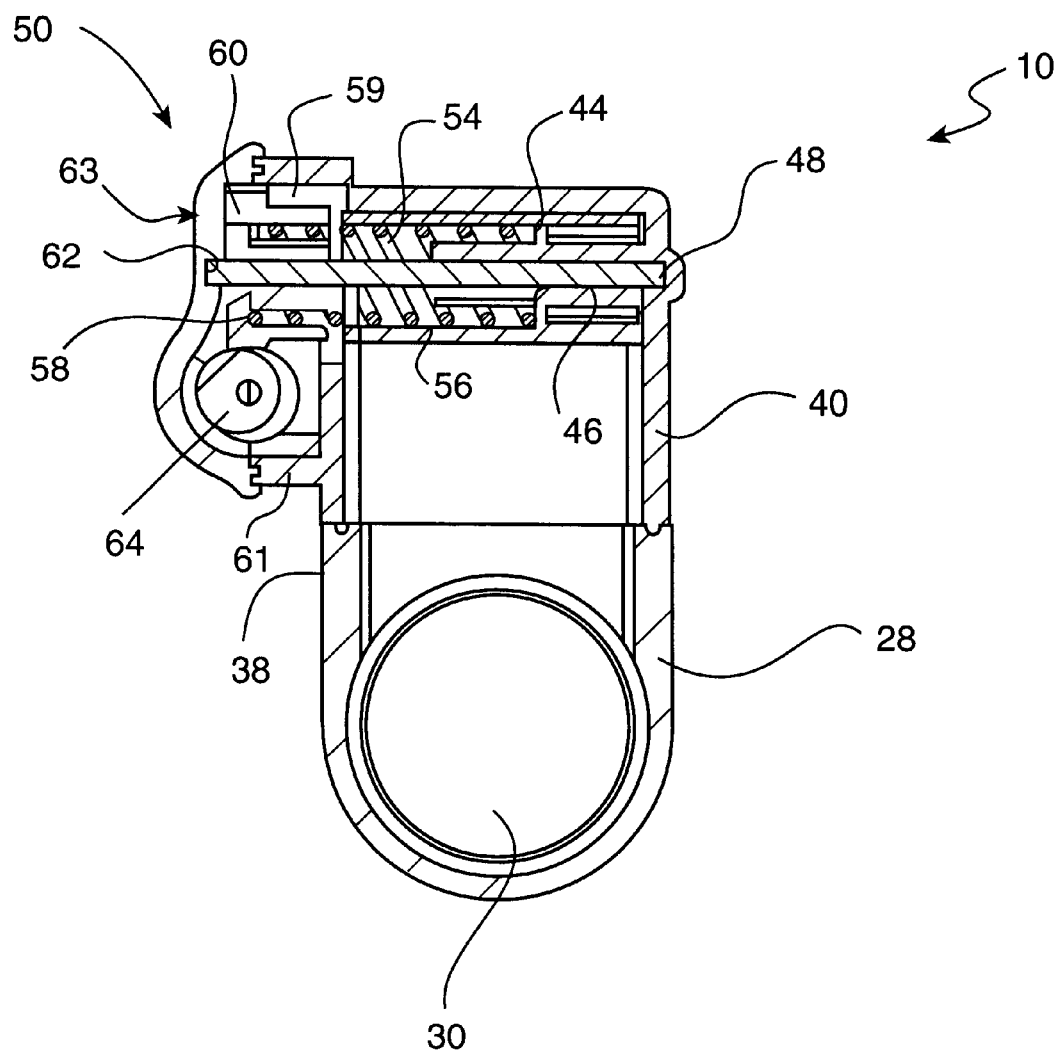
FIG. 5 is a transverse vertical sectional view taken generally on the line 5—5 of FIG. 3.

A coil spring 54 (FIGS. 4–5) is captured between the flap valve 42 and the adjustment assembly 50 for applying a predetermined and adjustably preset biasing force urging the flap valve 42 normally to the closed position. In this regard, in accordance with the illustrative preferred embodiment of the invention as shown, the coil spring 54 is carried about the pivot shaft 46 generally within an axially open counterbore 56 (FIGS. 4 and 5) formed in one end of the mounting sleeve 44 on the flap valve, with an associated inboard spring end 57 (FIGS. 9 and 10) turned radially inwardly to define a key for seated reception into a radially outwardly open notch on the mounting sleeve. An opposite outboard end of the coil spring 54 is seated within an axially inwardly open annular recess 58 (FIG. 5) formed in a central hub 59 of a spur-type adjustment gear 60, and includes a radially inturned outboard end 57' (FIG. 4) seated into a mating notch formed within the hub recess 58 whereby the outboard end 57' of the spring 54 is attached to the adjustment gear 60 for rotational movement therewith. The adjustment gear 60 is rotatably supported on the pivot shaft 46 within an outwardly open shell-shaped cowling 61 formed on an outboard side of the bypass duct 40. As shown best in FIG. 5, an outboard end of the pivot shaft 46 is supported in turn within a suitable pivot port 62 formed in a cap 63 mounted onto the cowling 61 by an adhesive or the like, with the adjustment gear 60 captured and retained at an inboard face of the cap 63 (FIGS. 4 and 5).

Within the cowling 61, the adjustment gear 60 is meshed with a short worm gear 64, as viewed best in FIGS. 4–8. A forward end of this worm gear 64 is rotatably supported in a recessed seat 66 (FIG. 6) formed within the cowling 61, whereas a rear end of the worm gear protrudes rearwardly from the cowling 61 through an aperture 68 (FIGS. 4 and 6) formed therein. An enlarged flange 67 is formed on the worm gear 64 near the rear end thereof to abut the inboard face of the cowling 61 and cap 63 lining the aperture 68 to retain the worm gear 64 in place. The rearmost end of the worm gear 64 defines a noncircular key 70 (shown best in FIG. 4) for press-fit reception into a matingly shaped hub 72 of a relatively large adjustment knob 74. A screw 75 or the like (FIG. 4) may be used to fasten the adjustment knob 74 onto the rear end key 70 of the worm gear 64.

Figure 6:
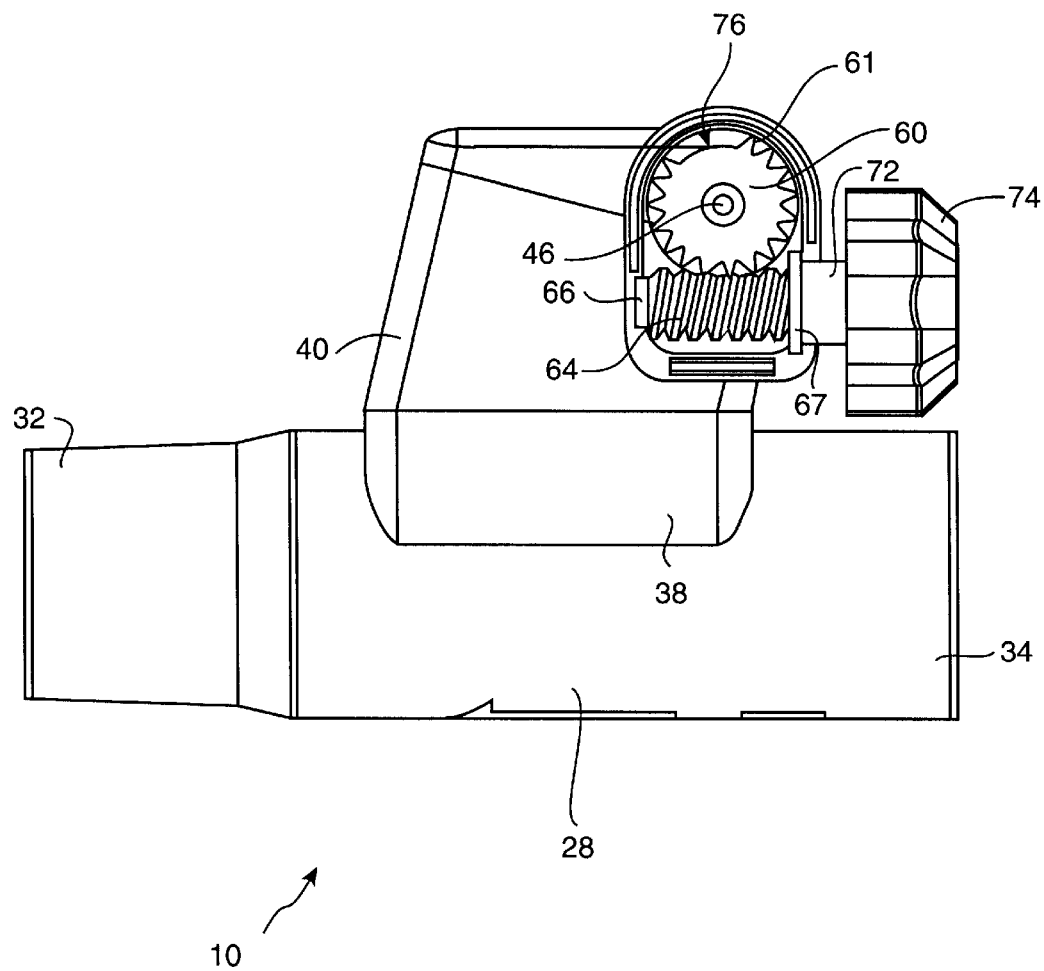
FIG. 6 is an enlarged longitudinal vertical sectional view of a portion of the flow controller, taken generally on the line 6—6 of FIG. 2, and showing adjustment of the flow controller to a substantially mid-range pressure setting.
Figure 7:
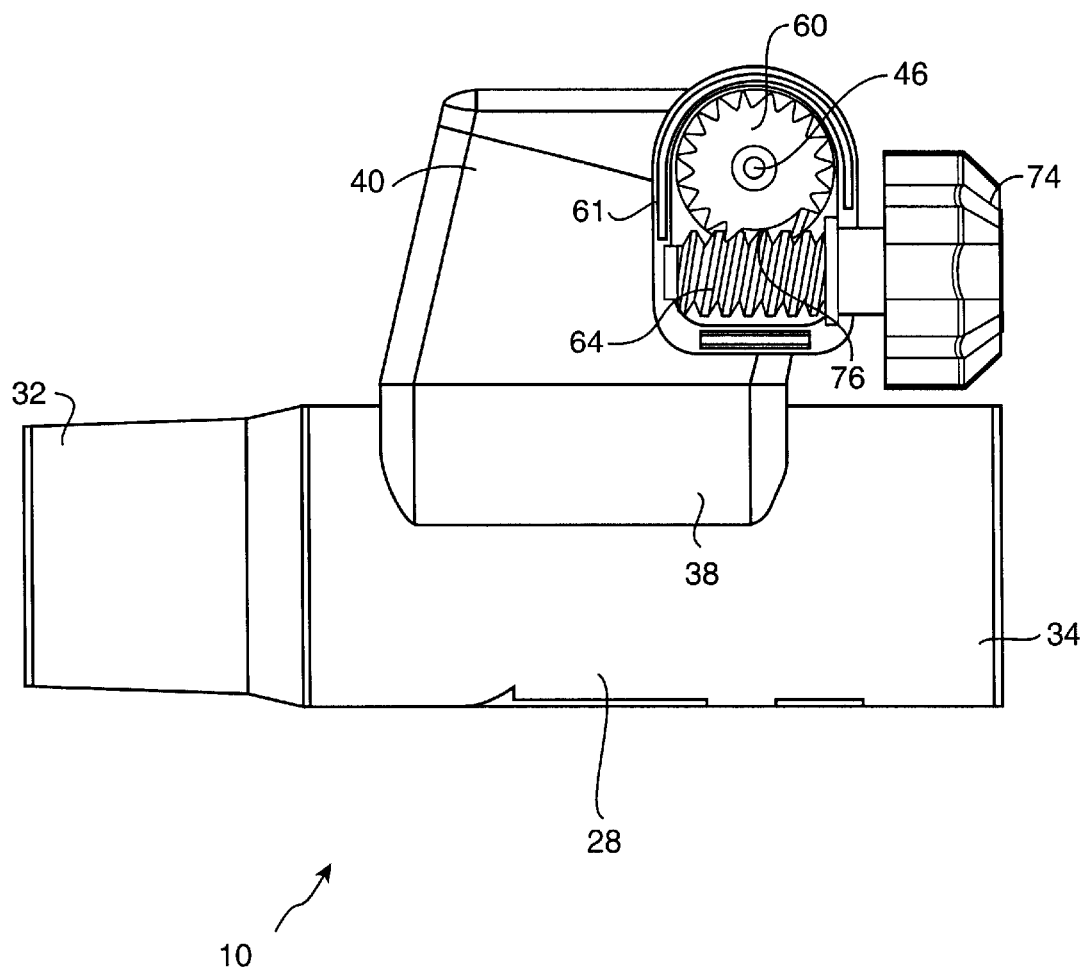
FIG. 7 is an enlarged vertical sectional view similar to FIG. 6, but depicting adjustment of the flow controller to a substantially maximum pressure setting.
Figure 8:
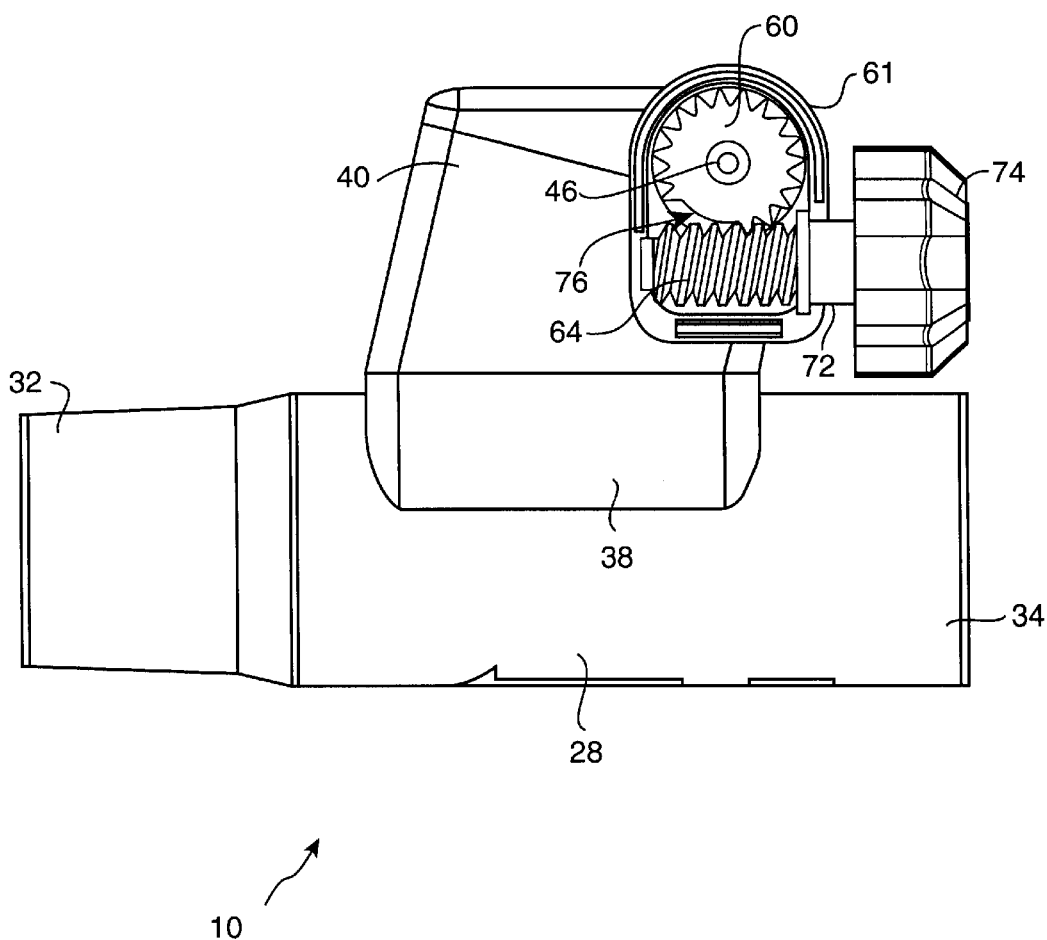
FIG. 8 is an enlarged vertical sectional view similar to FIG. 6, but depicting adjustment of the flow controller to a substantially minimum pressure setting.

In operation, as viewed best in FIGS. 6–8, the adjustment knob 74 is rotatably set for adjustably setting the torsional spring force applied by the spring 54 to the flap valve 42 to urge the flap valve to the normal position closing the bypass relief port 17. In this regard, rotation of the adjustment knob 74 in a clockwise direction is effective to rotate the worm gear 64 in a direction for rotating the adjustment gear 60 to partially wind up the spring 54 and thereby increase the closure force applied to the flap valve, whereas adjustment knob rotation in a counter-clockwise direction partially unwinds the spring 54 to reduce the applied closure force. The magnitude of the applied closure force is directly proportional to the magnitude of the suction pressure within the main flow path 30 required to draw the flap valve 42 to an open position. When the suction pressure reaches this threshold, the flap valve moves to a modulated open position sufficient to maintain the suction pressure at a substantially constant level.

In accordance with one aspect of the invention, the gear interface of the worm gear 64 and the adjustment gear 60 provides a substantial mechanical advantage such that relatively large angular rotational movement of the adjustment knob 74 and associated worm gear 64 results in a significantly smaller angular adjustment applied to the adjustment gear 60 and spring 54. That is, the adjustment knob 74 has a relatively large diametric size in comparison with the diametric size of the worm gear 64 to accommodate easy manual worm gear displacement. In addition, each full rotation of the worm gear 64 in either direction functions to displace the spur gear 60 through a comparatively smaller angular displacement equivalent to a single gear tooth thereon. This permits the particular spring force applied to the flap valve 42 to be selected with substantial fine-tuning precision, for correspondingly selecting the desired threshold pressure at which the flap valve 42 opens during operation. In addition, the gear interface between the worm gear 64 and the adjustment gear 60 is substantially self-locking, whereby the adjustable set position of the knob 74 will normally be retained without requiring additional locking structures.

Figure 9:
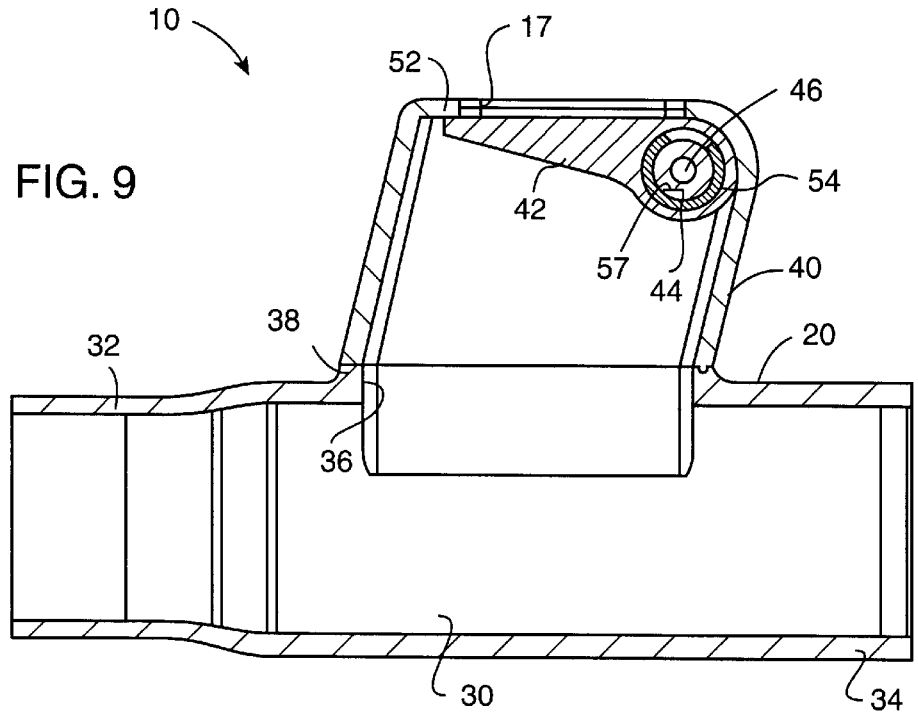
FIG. 9 is a longitudinal vertical sectional view taken generally on the line 9—9 of FIG. 2, and showing a spring-biased flap valve in a normal position closing a bypass relief port.
Figure 10:
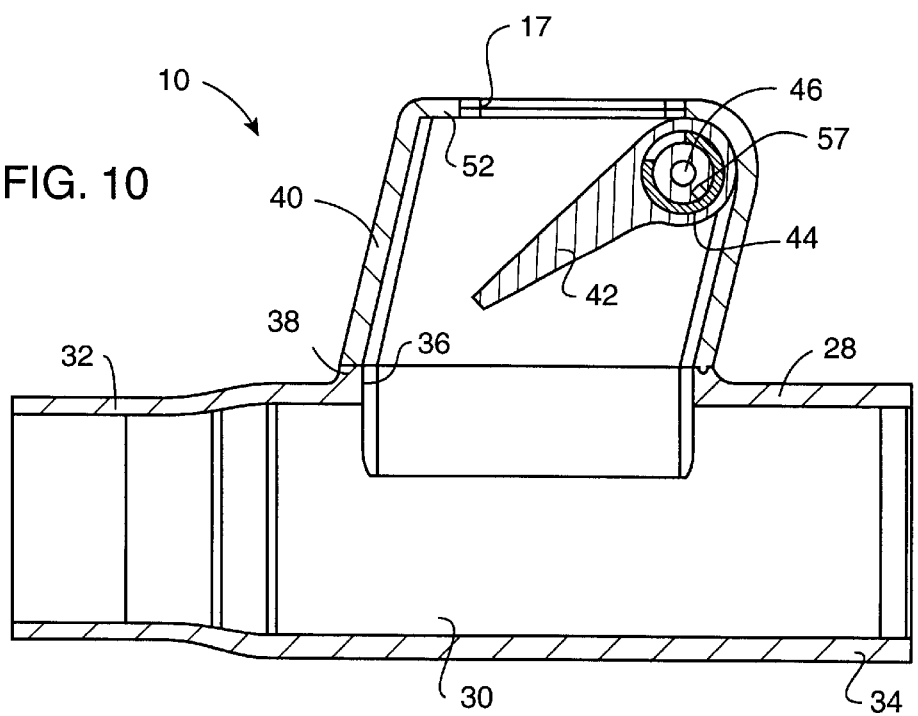
FIG. 10 is a longitudinal vertical sectional view similar to FIG. 9, but depicting the flap valve in a partially opened position for modulating water flow through the bypass relief port.

In accordance with a further important aspect of the invention, the limit or stop means is provided for limiting spring force adjustment to a predetermined range associated with a predetermined range of pressures for opening the flap valve 42. More particularly, as shown in FIGS. 4 and 6–8, the preferred limit or stop means comprises an arcuate gap segment 76 formed on the periphery of the adjustment spur gear 60 and comprising one or more absent or missing gear teeth to define the arcuate gap of sufficient span for unmeshing the spur gear 60 with respect to the worm gear 64. In the preferred form as illustrated, the arcuate gap segment 76 encompasses an arcuate span corresponding to an arcuate span of about four gear teeth, equivalent to about 90° of the spur gear circumference. With this construction, the adjustment spur gear 60 can be rotated by the adjustment knob 74 and associated worm gear 64 in either rotational direction to a limit stop defined by alignment of the gap segment 76 with the worm gear 64. When this occurs, further rotation of the worm gear 64 is ineffective to cause further rotation of the adjustment gear 60, and thereby is also ineffective to cause further adjustment to wind or unwind the spring 54. FIG. 9 shows the adjustment gear 60 rotated to a position associated with maximum winding of the spring 54, whereas FIG. 10 shows the adjustment gear 60 rotated to an opposite position associated with maximum unwinding of the spring 54. In either position (FIG. 9 or 10), the spring 54 applies a backlash torque to the adjustment gear 60 so that one gear tooth adjacent the gap segment 76 is retained in contact with the worm gear 64. With this design, attempted over-rotation of the adjustment knob 74 and worm gear 64 in either direction is accompanied by an audible click as the spring torque retains the single gear tooth adjacent the gap segment 76 in contact with the worm gear. Conversely, upon reverse rotation of the adjustment knob 74, the spring torque re-meshes the adjustment spur gear 60 with the worm gear 64 for incremental rotation in the opposite direction to decrease or increase the spring force, as appropriate.

The adjustment assembly 50 can thus be quickly and easily set to vary the spring force 54 applied to the flap valve 42 upwardly or downwardly with a predetermined range of adjustment, for purposes of fine-tuning the operating characteristics of the pool cleaner 12 for substantially optimized cleaning performance in a given swimming pool. The predetermined range of spring force adjustment is associated with a corresponding predetermined range of threshold pressures for modulated opening of the flap valve 42 to regulate water pressure applied to the pool cleaner 12 to a substantially constant pressure level associated with optimized pool cleaner performance. Importantly, the limit stop provided by the arcuate gap segment 76 on the adjustment spur gear 60 prevents over-adjustment in either direction without risk of mechanical component breakage or failure.

A variety of modifications and improvements in and to the flow controller 10 of the present invention will be apparent to those persons skilled in the art. For example, while the invention has been shown and described with respect to a vacuum hose 16 for connection to a suction-powered pool cleaner, it will be understood that the principles of the invention may be applied to a flexible hose of the type for supplying water under pressure to a pressure-powered pool cleaner. Moreover, in a suction powered cleaner application, it will be understood that the flow controller may be installed within the skimmer well, or alternately at or within the pool cleaner, at either end of the vacuum hose 16, or in conjunction with other types of pool equipment wherein a regulated pressure is desired.

What is claimed is:

1. A flow controller for a pool cleaner or the like adapted for connection via a flow line to a fluid pressure source, said flow controller comprising:

housing means adapted for mounting in-line along the flow line and defining a flow path extending therethrough, said housing means further defining a laterally open bypass relief port;

a valve member carried by said housing means for movement between a closed position closing said bypass relief port and an open position opening said bypass relief port;

spring means for applying a spring force urging said valve member toward said closed position, said spring force acting on said valve member in a direction so that fluid pressure within said housing means displaces said valve member to said open position when said fluid pressure has a magnitude exceeding said spring force; and an adjustment assembly for adjustably setting the magnitude of said spring force, said adjustment assembly including a first gear rotatably carried by said housing means and coupled to said spring means for winding and unwinding said spring means upon rotation of said first gear respectively in opposite directions, a second gear rotatably carried by said housing means in meshed relation with said first gear and configured to provide a mechanical advantage whereby rotation of said second gear through a selected angular increment results in a corresponding rotation of said first gear through a comparatively smaller angular increment, and an adjustment knob for rotatably displacing said second gear to rotatably adjust said first gear and thereby variably select the magnitude of said spring force.

2. The flow controller of claim 1 wherein said fluid pressure source comprises a vacuum source.

3. The flow controller of claim 1 wherein said first gear comprises a spur gear and further wherein said second gear comprises a worm gear.

4. The flow controller of claim 3 wherein said adjustment knob is coupled to one end of said worm gear and is positioned for manual displacement for rotatably displacing said worm gear.

5. The flow controller of claim 4 wherein said adjustment knob has a relatively large diametric size in comparison with the diametric size of said worm gear.

6. The flow controller of claim 3 wherein said spring means comprises a coil spring connected between said spur gear and said valve member.

7. The flow controller of claim 6 wherein said valve member comprises a valve flap pivotally mounted on said housing means.

8. The flow controller of claim 1 wherein said adjustment assembly further includes a pair of limit stops respectively defining opposite end limits of a predetermined range of spring force adjustment.

9. The flow controller of claim 3 wherein said spur gear includes a peripheral array of gear teeth interrupted by an arcuate gap segment defining opposite end limits of a predetermined range of spring force adjustment.

10. The flow controller of claim 9 wherein said arcuate gap segment comprises an arcuate span of about 90° of the spur gear circumference.

11. A flow controller for a pool cleaner or the like adapted for connection via a flow line to a fluid pressure source, said flow controller comprising:

housing means adapted for mounting in-line along the flow line and defining a flow path extending therethrough, said housing means further defining a laterally open bypass relief port;

a valve member carried by said housing means for movement between a closed position closing said bypass relief port and a modulated open position opening said bypass relief port;

spring means for applying a spring force urging said valve member toward said closed position, said spring force acting on said valve member in a direction so that fluid pressure within said housing means displaces said valve member to said modulated open position when said fluid pressure has a magnitude exceeding said spring force, whereby said valve member in said modulated open position maintains the fluid pressure within said housing means at a substantially constant pressure level; and an adjustment assembly for adjustably setting the magnitude of said spring force, said adjustment assembly including a first gear rotatably carried by said housing means and coupled to said spring means for winding and unwinding said spring means upon rotation of said first gear respectively in opposite directions, a second gear rotatably carried by said housing means in meshed relation with said first gear, and an adjustment knob for rotatably displacing said second gear to rotatably adjust said first gear and thereby variably select the magnitude of said spring force;

said first gear including a peripheral array of gear teeth interrupted by an arcuate gap segment defining opposite end limits of a predetermined range of spring force adjustment.

12. The flow controller of claim 11 wherein said fluid pressure source comprises a vacuum source.

13. The flow controller of claim 11 wherein said first gear comprises a spur gear and further wherein said second gear comprises a worm gear.

14. The flow controller of claim 13 wherein said adjustment knob is coupled to one end of said worm gear and is positioned for manual displacement for rotatably displacing said worm gear.

15. The flow controller of claim 14 wherein said adjustment knob has a relatively large diametric size in comparison with the diametric size of said worm gear.

16. The flow controller of claim 13 wherein said spring means comprises a coil spring connected between said spur gear and said valve member.

17. The flow controller of claim 16 wherein said valve member comprises a valve flap pivotally mounted on said housing means.

18. The flow controller of claim 11 wherein said arcuate gap segment comprises an arcuate span of about 90° of the spur gear circumference.

* * * * *